United States Patent
Bares et al.

(10) Patent No.: US 9,334,634 B2
(45) Date of Patent: May 10, 2016

(54) MIXING VALVE ASSEMBLY FOR FAUCET

(71) Applicant: Kohler Co., Kohler, WI (US)

(72) Inventors: William Bares, Fredonia, WI (US); John C. Esche, Kohler, WI (US)

(73) Assignee: KOHLER CO., Kohler, WI (US)

( * ) Notice: Subject to any disclaimer, the term of this patent is extended or adjusted under 35 U.S.C. 154(b) by 103 days.

(21) Appl. No.: 14/206,601

(22) Filed: Mar. 12, 2014

(65) Prior Publication Data

US 2014/0261747 A1 Sep. 18, 2014

Related U.S. Application Data

(60) Provisional application No. 61/793,560, filed on Mar. 15, 2013.

(51) Int. Cl.
| | |
|---|---|
| *F16K 27/00* | (2006.01) |
| *E03C 1/04* | (2006.01) |
| *F16L 37/00* | (2006.01) |
| *F16K 11/00* | (2006.01) |
| *F16L 37/14* | (2006.01) |

(52) U.S. Cl.
CPC .............. *E03C 1/0403* (2013.01); *F16K 19/00* (2013.01); *F16K 19/006* (2013.01); *F16L 37/00* (2013.01); *F16L 37/144* (2013.01); *Y10T 137/0502* (2015.04); *Y10T 137/6014* (2015.04); *Y10T 137/86815* (2015.04); *Y10T 137/86823* (2015.04)

(58) Field of Classification Search
CPC ................ Y10T 137/86823; Y10T 137/9464; Y10T 137/6014
USPC ........................................................ 285/305
See application file for complete search history.

(56) References Cited

U.S. PATENT DOCUMENTS

| | | | | |
|---|---|---|---|---|
| 3,973,791 | A | | 8/1976 | Porta et al. |
| 4,423,752 | A | * | 1/1984 | Psarouthakis ......... F16K 11/022 137/270 |
| 4,561,682 | A | | 12/1985 | Tisserat |
| 5,169,178 | A | * | 12/1992 | Hunzinger ......... B60H 1/00521 165/76 |
| 5,219,185 | A | * | 6/1993 | Oddenino ............. F16L 37/088 285/187 |
| 5,271,646 | A | * | 12/1993 | Allread ................ B60H 1/3223 285/124.2 |
| 5,332,268 | A | * | 7/1994 | Godeau ................. F16L 37/088 285/26 |
| 5,464,256 | A | * | 11/1995 | Godeau ................. F16L 37/088 285/124.1 |

(Continued)

FOREIGN PATENT DOCUMENTS

| | | |
|---|---|---|
| CN | 1287237 A | 3/2000 |
| CN | 1723356 A | 1/2006 |

(Continued)

OTHER PUBLICATIONS

Bradley Corp., Installation Guide for Navigator Thermostatic Mixing Valve for Sinks/Faucets; dated Jan. 17, 2013, 3 pages.

(Continued)

*Primary Examiner* — Craig Schneider
*Assistant Examiner* — R. K. Arundale
(74) *Attorney, Agent, or Firm* — Foley & Lardner LLP (57) ABSTRACT

A mixing valve for a faucet includes a body configured to receive therein end portions of a fluid supply line and a fluid outlet line, and a coupler. The coupler is configured for insertion through a sidewall of the body to engage features of the fluid supply line and the fluid outlet line so as to retain the fluid supply line and the fluid outlet line within the body.

20 Claims, 5 Drawing Sheets

(56) References Cited

U.S. PATENT DOCUMENTS

| | | | |
|---|---|---|---|
| 6,073,972 A * | 6/2000 | Rivera | E03C 1/04 137/801 |
| 6,684,906 B2 | 2/2004 | Burns et al. | |
| 6,738,996 B1 | 5/2004 | Malek et al. | |
| 7,690,623 B2 | 4/2010 | Parsons et al. | |
| 2003/0146619 A1 * | 8/2003 | Souvatzidis | F16L 37/56 285/124.5 |
| 2005/0138725 A1 | 6/2005 | Hwang | |
| 2009/0189108 A1 | 7/2009 | Ritter et al. | |
| 2009/0256348 A1 | 10/2009 | Bors et al. | |
| 2011/0061754 A1 | 3/2011 | Thomas et al. | |
| 2011/0073205 A1 | 3/2011 | Marty et al. | |
| 2012/0018020 A1 * | 1/2012 | Moore | E03C 1/0403 137/798 |
| 2013/0199645 A1 * | 8/2013 | Hsu | F16K 19/006 137/801 |

FOREIGN PATENT DOCUMENTS

| | | |
|---|---|---|
| CN | 101932862 A | 12/2010 |
| EP | 1 457 727 A2 | 9/2004 |
| WO | WO-99/26010 | 5/1999 |
| WO | WO-2011/135345 | 11/2011 |

OTHER PUBLICATIONS

Extended European Search Report for European Patent Application No. 14160130, dated Jul. 1, 2014, 7 pages.

Chinese First Office Action dated Nov. 27, 2015, from related Chinese patent application No. 201410096567.3.

* cited by examiner

MIXING VALVE ASSEMBLY FOR FAUCET

CROSS-REFERENCE TO RELATED PATENT APPLICATIONS

This application claims the benefit of and priority to U.S. Provisional Application No. 61/793,560, filed on Mar. 15, 2013, the entire disclosure of which is incorporated herein by reference.

BACKGROUND

The present disclosure relates to the field of mixing valve assemblies for faucets.

Conventional mixing valve assemblies typically receive a hot water supply and a cold water supply. A mixing valve includes a chamber or space where water from each supply is mixed together. A water outlet line directs water out of the mixing valve to a spout or other outlet. A mixing valve assembly may also typically include one or two valves which control the amount of water provided by each supply line, thereby controlling the temperature of water in the water outlet, and the flow rate of water through the water outlet.

Several federal and state laws and regulations, for example, the Safe Drinking Water Act, limit the amount of lead that can be used in faucets. Because some brasses may contain some lead, it may be desirable to use other materials in mixing valve assemblies in order to minimize the contact between potable water and leaded brass housings.

Water supply lines may be configured to couple to a mixing valve assembly in a variety of ways. For example, copper tubes may be brazed to a valve assembly. PEX tubes may be overmolded onto a waterway or valve assembly. A stainless steel or nylon braided hose may include a threaded end fitting that threads into a waterway or valve assembly. Also, a supply line may be retained within a mixing valve assembly using a mechanical device, such as a clip. Such a configuration is taught, for example, by U.S. patent application Ser. No. 12/358,696. An end fitting for a water supply line may include a sealing member, such as a rubber o-ring, to provide a water seal between the supply line and a mixing valve assembly.

It would be advantageous to provide an improved mixing valve assembly for a faucet that addresses one or more of the aforementioned issues.

SUMMARY

According to an exemplary embodiment, a mixing valve for a faucet includes a body configured to receive therein end portions of a fluid supply line and a fluid outlet line, and a coupler. The coupler is configured for insertion through a sidewall of the body to engage features of the fluid supply line and the fluid outlet line so as to retain the fluid supply line and the fluid outlet line within the body.

According to another exemplary embodiment, a mixing valve for a faucet includes a body configured to receive therein end portions of a plurality of fluid supply lines and a fluid outline line, and a coupler. The coupler is configured to retain all of the fluid supply lines and the fluid outlet line within the body.

According to yet another exemplary embodiment, a mixing valve for a faucet may be assembled by receiving end portions of a fluid supply line and a fluid outline line within apertures of a body of a mixing valve, and inserting a coupler through a sidewall of the body to engage features of the fluid supply line and the fluid outlet line so as to retain the fluid supply line and the fluid outlet line within the body.

DETAILED DESCRIPTION

Figure 1:
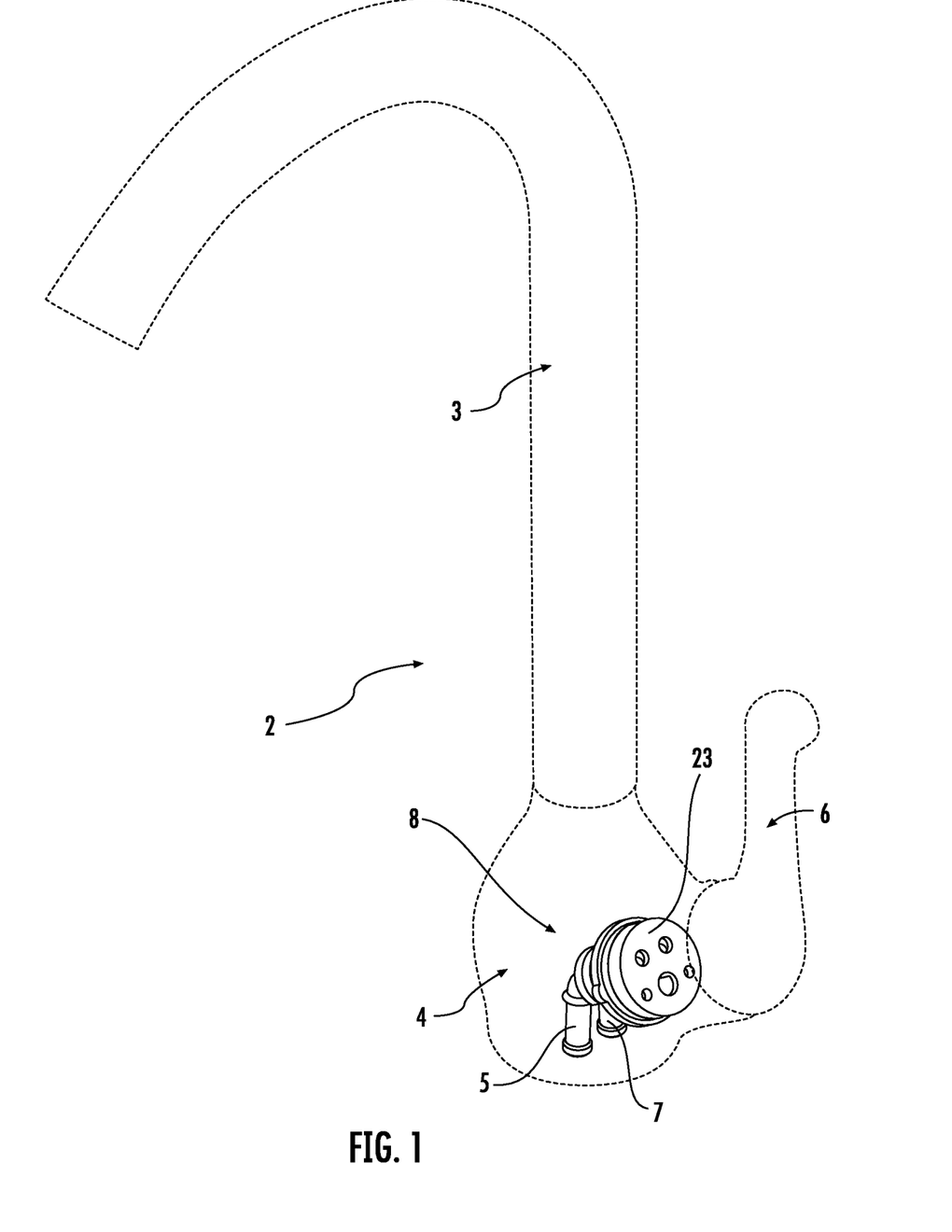
FIG. 1 is a perspective view of a faucet assembly according to an exemplary embodiment.

Referring to FIG. 1, and according to an exemplary embodiment, a faucet assembly 2 includes, among other elements, a faucet spout 3, a spout hub or base 4, a valve assembly, a handle 6, a plurality of fluid supply lines 5, 7, a mixing valve assembly 8, and a valve assembly (not shown) interfacing or engaging with the mixing valve assembly 8. The faucet assembly 2 may mount to a sink deck, a countertop, or other mounting surface in any suitable manner. The faucet assembly 2 may include two water supply lines, such as supply line 5 and supply line 7 (i.e., one used to carry hot water and one for cold water) that are coupled to a mixing valve 1. The supply lines 5, 7 may be configured to withstand a normal operating water pressure of approximately 50 psi. While FIG. 1 shows a particular type of faucet, it should be understood that other types of faucets may be used with the mixing valve assemblies discussed herein according to other exemplary embodiments.

Further referring to FIG. 1, the mixing valve 1 may be positioned within the spout hub 4. The two supply lines 5, 7 are coupled to an inlet end of the mixing valve 1, and may extend downwards toward a mounting surface (not shown) for the faucet assembly 2. The mixing valve 1 may be oriented within the spout hub 4 so that a upper surface 23 of the mixing valve 1 is faced toward a valve assembly (not shown). The valve assembly may be configured so that water supplied from the supply lines 5, 7 is mixed within the valve assembly. Once the water is mixed within the valve assembly, it may flow toward the faucet spout 3. A sealing member (not shown) may be disposed between the valve assembly and the upper surface 23 of the mixing valve 1. Further, in order to prevent water from escaping beyond the valve assembly, the sealing member may be used to sealingly couple the valve assembly and the mixing valve 1. While FIG. 1 shows a particular orientation of the mixing valve assembly 8 within the faucet assembly 2, it should be understood that a mixing valve assembly may be arranged in other ways within a faucet assembly.

A mixing valve may be coupled to a valve assembly through various other means. For example, a valve assembly may include a hole used to receive an end proximate the upper surface of a mixing valve. The hole in a valve assembly and an end of a mixing valve may be configured to be coupled according to a particular orientation, thereby ensuring the mixing valve is properly positioned with the valve assembly. For example, the end of a mixing valve may include a protrusion which is configured to engage a recession of the valve assembly, thereby ensuring that the mixing valve and the valve assembly are engaged in a particular orientation.

According to another exemplary embodiment, a mixing valve assembly may be mounted or positioned in a location spaced away from a faucet spout. For example, a mixing valve assembly may be positioned underneath a sink deck, above a sink deck, or in any other suitable location according to other exemplary embodiments.

According to an exemplary embodiment, the mixing valve assembly 8 may be used to control the amount of water that flows from the supply lines 5, 7 to the faucet spout 3. For example, the mixing valve assembly 8 may include a valve, and the position of the valve over the upper surface 23 may control the flow of fluid from the supply lines 5, 7 to the faucet spout 3. For example, the valve may be pivoted so that the supply line 5 (supplying, e.g., hot water), is in fluidic communication with an outlet line (see, e.g., the fluid conduit 11 in FIG. 7) while the supply line 7 (supplying, e.g., cold water) is not in fluidic communication with an outlet line. A user may control the position of the valve (and therefore, the temperature and flow rate of water flowing through the faucet spout 3) by pivoting the handle 6.

Figure 2:
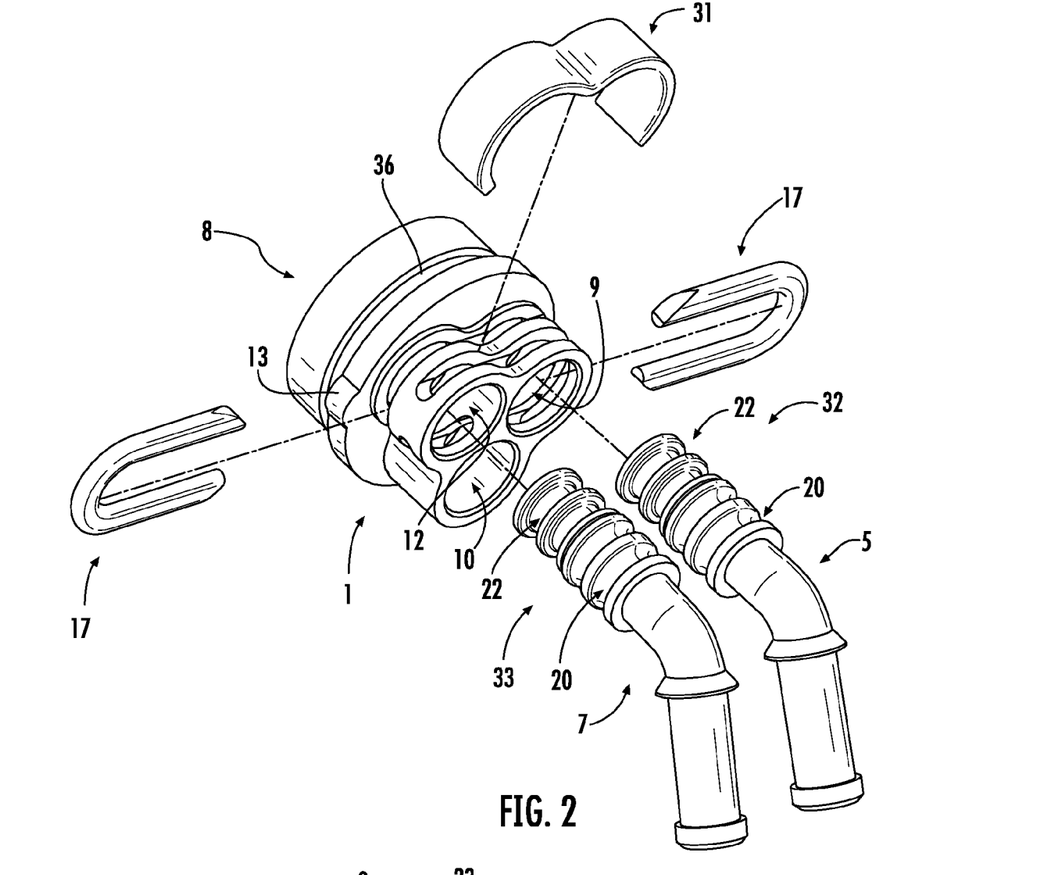
FIG. 2 is an exploded perspective view of a mixing valve assembly for use with a faucet, such as that shown in FIG. 1, according to an exemplary embodiment.
Figures 7, 8, 9, 10:
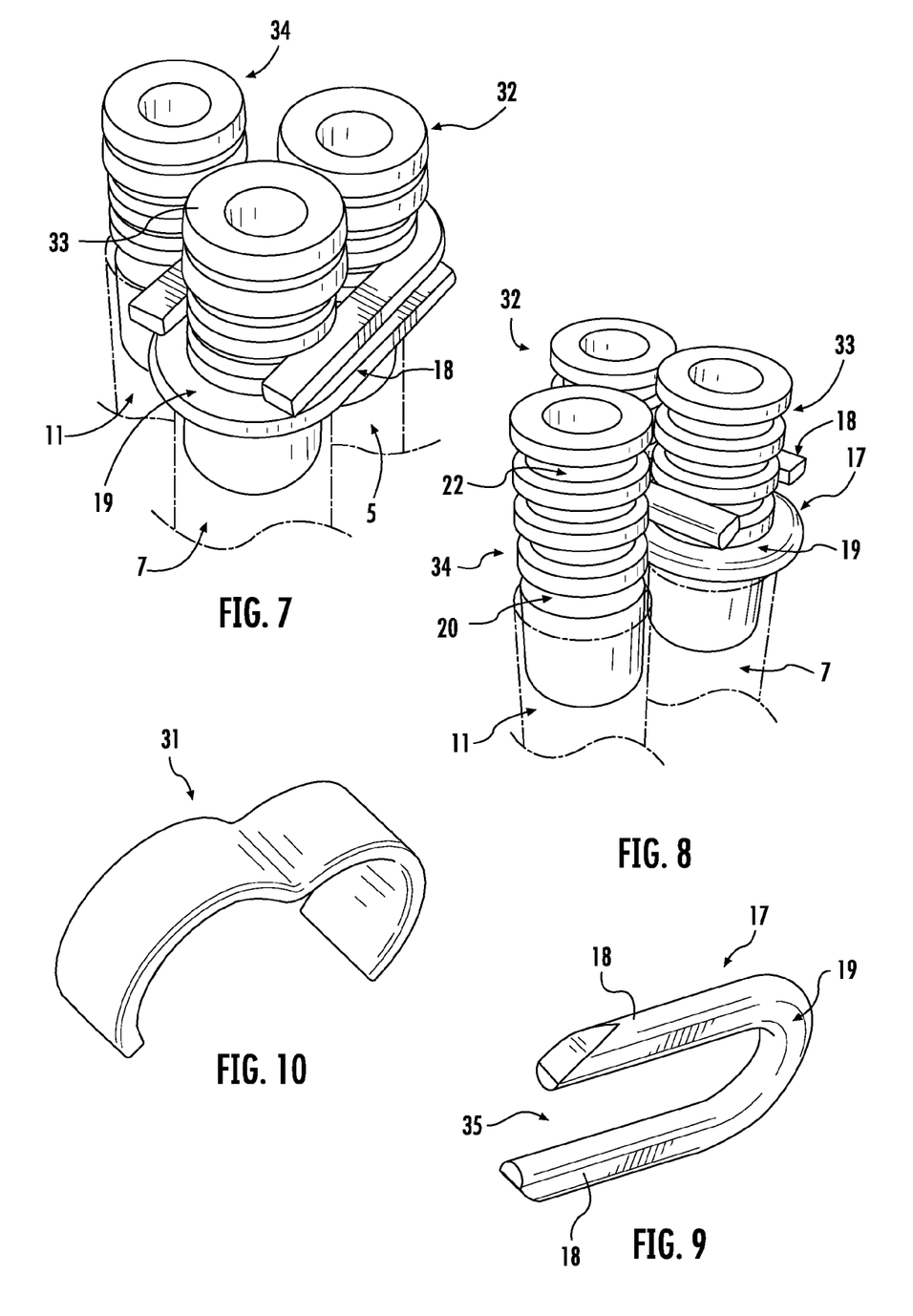
FIG. 7 is a perspective view of hose end coupling members interfacing with U-shaped clips, according to an exemplary embodiment.
FIG. 8 is another perspective view of the hose end coupling members shown in FIG. 7 interfacing with U-shaped clips.
FIG. 9 is a perspective view of a U-shaped clip for a mixing valve assembly.
FIG. 10 is a perspective view of an outer clip for a mixing valve assembly.

Referring to FIG. 2, and according to an exemplary embodiment, the mixing valve assembly 8 includes the mixing valve 1, the supply lines 5, 7, at least one U-shaped clip 17 (two of which are shown in FIG. 2), an outer clip 31, and a fluid conduit 11 (not illustrated in FIG. 2, but shown, for example, in FIG. 7). The mixing valve 1 may include an outlet port (e.g., bore, hole, harbor, etc.), such as an outlet port 10, which includes a receiving end that is configured to receive the fluid conduit 11. Also, the mixing valve 1 may include two inlet ports (e.g., bores, holes, harbors, etc.), such as inlet ports 9 and 12. Further, the inlet ports 9, 12 may be configured to receive either of the supply lines 5, 7 near a first end portion 37 of the mixing valve 1. Each inlet port 9, 12 may include a counterbore so that a proscribed portion of the supply lines 5, 7 are received therein.

Further referring to FIG. 2, each of the U-shaped clips 17 may be configured to be received within a lateral slot 14, 16 (not shown in FIG. 2, but shown, for example, in FIG. 4) (i.e., an aperture, opening, slit, etc.) disposed within a side wall 15 (not shown in FIG. 2, but shown, for example, in FIG. 6) of the mixing valve 1. As shown in FIG. 2, the mixing valve 1 may include two lateral slots, each of which are openly disposed on opposite sides of the mixing valve. The outer clip 31 is configured to couple to a portion of the side wall 15 of the mixing valve 1 and the U-shaped clips 17. For example, the outer clip 31 may be configured to retain the U-shaped clips 17 within the mixing valve 1 when the outer clip 31 is coupled to the side wall of the mixing valve 1.

Figure 3:
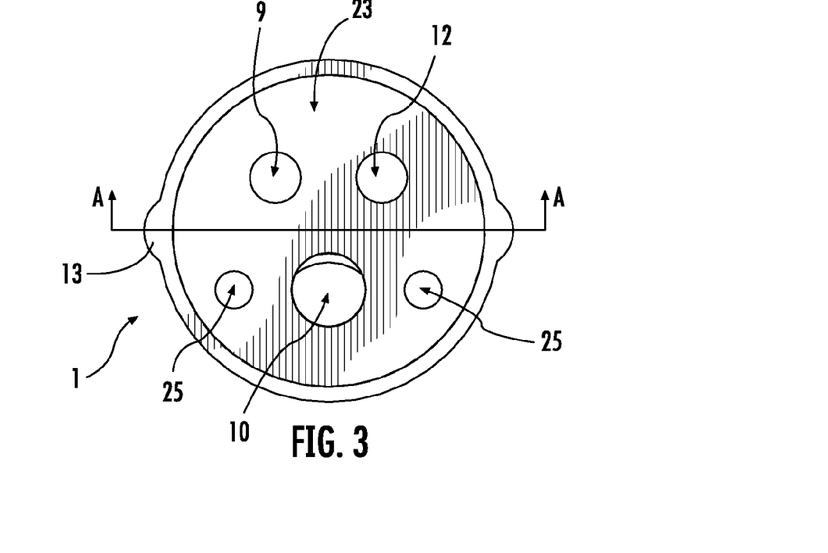
FIG. 3 is a bottom plan view of the mixing valve shown in FIG. 1.

Referring to FIG. 3, the inlet ports 9, 12 and the outlet port 10 may be holes that extend through the mixing valve 1. Further, the inlet ports 9, 12 may be defined on an upper side by the upper surface 23 of the mixing valve 1. As shown in FIG. 3, the inlet ports 9, 12 may be positioned adjacent to each other within the mixing valve 1. Also, the outlet port 10 may be positioned offset from, and between the inlet ports 9, 12. While FIG. 3 shows a particular arrangement of inlet and outlet ports of a mixing valve, it should be understood that inlet and outlet ports for a mixing valve may be arranged in other ways, according to other exemplary embodiments. For example, the outlet port for the mixing valve may linearly aligned with a plurality of inlet ports.

In an exemplary embodiment, the mixing valve 1 may be made from 30% glass-filled nylon. However, it should be understood that other materials may be used to make a mixing valve, such as other polymeric materials, a metal, a composite material, or any other suitable material, according to other exemplary embodiments.

Further, the mixing valve 1 may include various features or elements used to position the mixing valve relative to the spout hub 4 or a valve assembly. For example, a plurality of positioning members 13 (e.g., protrusions, projections, extensions, locators, etc.) may be disposed on an outer surface of the body portion of the mixing valve 1. As shown in FIG. 3, the positioning member 13 may be configured as a protrusion which is coupled to a generally cylindrical outer surface (i.e., a radial surface) of the mixing valve 1. The positioning member 13 may be integrally formed with the mixing valve 1. An inner surface of the spout hub 4 (which is not shown) may include a plurality of positioning recesses that are each configured to receive either of the positioning members 13.

In addition to the positioning members 13 used to position the mixing valve 1, the mixing valve may include a plurality of positioning holes 25, which are disposed within the upper surface 23. The positioning holes 25 may be configured to be received by a plurality of positioning protrusions of a facing valve assembly (which is not shown), in order to position the valve assembly onto the mixing valve 1. It should be understood that a mixing valve may include other members and features used to position (e.g., orient, align, etc.) the mixing valve within a faucet assembly, according to other exemplary embodiments.

Figure 4:
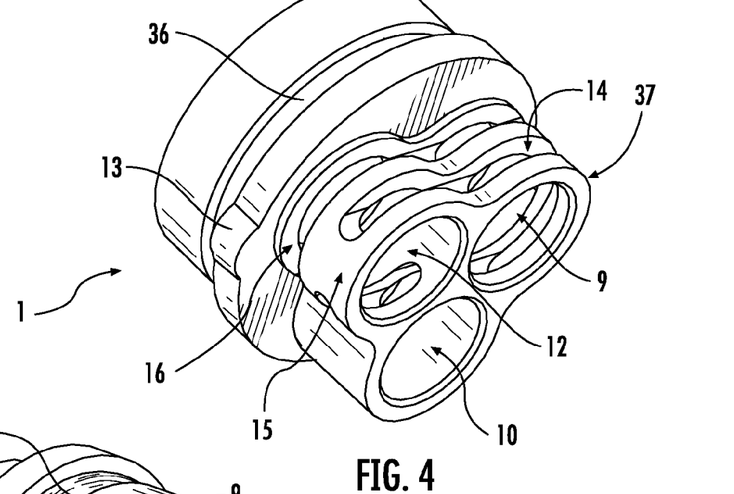
FIG. 4 is a perspective view of the mixing valve shown in FIG. 3.
Figure 5:
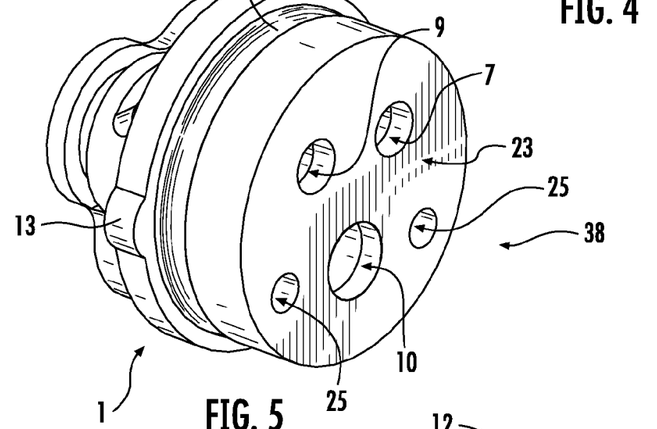
FIG. 5 is another perspective view of the mixing valve shown in FIGS. 3-4.
Figure 6:
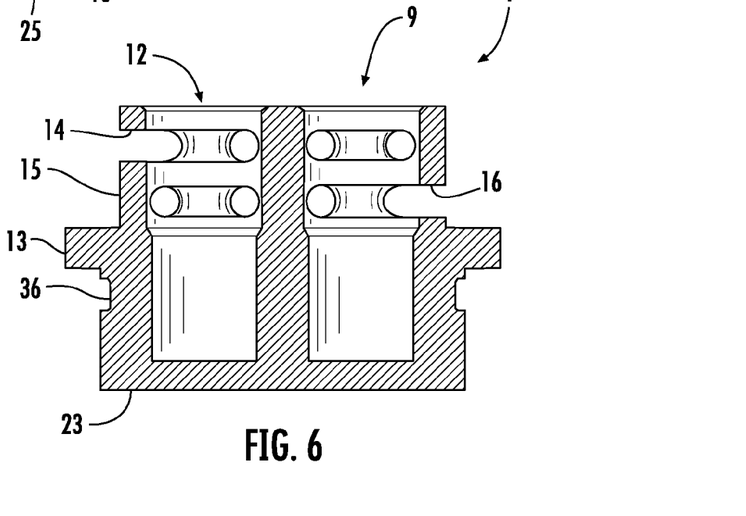
FIG. 6 is a cross-sectional view of the mixing valve shown in FIG. 3, taken along line A-A.

Referring now to FIGS. 4-6, according to an exemplary embodiment, the mixing valve 1 may include the first end portion 37 that is defined by the inlet ports 9, 12 and the outlet port 10, and an opposite second end portion 38 that is defined by the upper surface 23. The mixing valve may be generally cylindrical in the fully assembled state. However, while the figures show various types of mixing valves that may be used in a mixing valve assembly, it should be understood that other types of mixing valves may be used with the mixing valve assemblies discussed herein according to other exemplary embodiments.

Referring to FIG. 4, the inlet ports 9, 12 of the mixing valve 1 may include at least one lateral slot, such as a lateral slot 14 and a lateral slot 16. An opening for each of the lateral slots 14, 16 may be laterally disposed within a side wall 15 of the mixing valve 1. For a mixing valve that includes more than one lateral slot, such as the mixing valve 1, the lateral slots 14, 16 may be openly disposed within opposite sides of the mixing valve 1. Alternatively, the lateral slots 14, 16 may be openly disposed within one side of the mixing valve 1. Further, each of the lateral slots 14, 16 may extend through at least a portion of each inlet port 9, 12 and within at least a portion of the outlet port 10.

Referring to FIG. 6, and according to an exemplary embodiment, the lateral slot 14 may be positioned essentially vertically below the lateral slot 16, when the receiving ends of the inlet ports 9, 12 (i.e., the portions near the first end 37) are downwardly oriented. As shown in FIG. 4, the lateral slot 14 may be openly disposed on a first side of the mixing valve 1, and the lateral slot 16 may be openly disposed on a second side of the mixing valve 1, which is opposite the first side. According to another exemplary embodiment, the lateral slot 16 may be openly disposed on the same side of the mixing valve 1 as the lateral slot 14.

Referring to FIGS. 4-6, and according to an exemplary embodiment, the mixing valve 1 includes a radial groove 36. As shown in FIG. 5, the radial groove 36 is disposed vertically between the positioning members 13 and the upper surface 23. The radial groove 36 is configured to receive a sealing member, such as an o-ring, (which is not shown) that is configured to sealingly couple an exterior surface of the mixing valve 1 and another element of the mixing valve assembly 8, such as the spout hub 4. For example, if water were to leak beyond a sealing member disposed between the upper surface 23 and a valve assembly, then the sealing member received within radial groove 36 may be used prevent water from leaking beyond the radial groove 36, thereby preventing water from undesirably escaping below the mixing valve assembly 8 when the assembly is provided in a faucet assembly.

Referring now to FIG. 5, the diameter of the opening of the outlet port 10, which is defined by the upper surface 23 of the mixing valve 1, may be larger than either of the diameters of the openings of the inlet ports 9, 12, which are also defined by the upper surface 23. Referring to FIGS. 4 and 5, the diameters of the openings of the inlet ports 9, 12 defined by the upper surface 23 may be smaller than the openings defined by the receiving ends of the inlet ports 9, 12. In other words, the smaller openings of the inlet ports 9, 12 within the upper surface 23 may be used to constrain the supply lines 5, 7. Therefore, the inlet ports 9, 12 may be configured so that the supply lines 5, 7 are not able to extend past the upper surface 23 when the inlet ports 9, 12 are received by the supply lines 5, 7. Similarly, the diameter of the opening of the outlet port 10 defined by the upper surface 23 may be smaller than the opening defined by the receiving end of the outlet port 10. Therefore, the outlet port 10 may be configured so that the fluid conduit 11 is not able to extend past the upper surface 23 when the outlet port 10 is received by the fluid conduit 11.

Referring now to FIG. 6, a cross-sectional view of the mixing valve 1 is shown. The inlet ports 9, 12 are shown as extending downward through the mixing valve 1. The radial groove 36 is shown as being positioned below the protrusions 13, when the upper surface 23 is downwardly facing. The lateral slots 14, 16 are shown as being positioned above the protrusions 13, when the upper surface is upwardly facing. Further, the lateral slots 16, 14 extend laterally through the mixing valve.

Referring now to FIGS. 7 and 8, the supply lines 5, 7 and the fluid conduit 11 are shown interfacing with the two U-shaped clips 17 as they would within the mixing valve 1 when assembled therein. According to an exemplary embodiment, the supply lines 5, 7, and the fluid conduit 11 are configured to be coupled to the U-shaped clips when the supply lines 5, 7 are received within the receiving ends of the inlet ports 9, 12, and the fluid conduit is received within the receiving end of the outlet port 10. However, in order to clearly show the relationship between the U-shaped clips 17, the supply lines 5, 7, and the fluid conduit 11, these elements are shown without the mixing valve 1.

As shown in FIGS. 7 and 8, a coupling, such as a coupling 32, 33, is coupled to an end of each of the supply lines 5, 7, respectively. Similarly, a coupling 34 is coupled to an end of the fluid conduit 11. When the supply lines 5, 7 are received within the inlet ports 9, 12 and the fluid conduit 11 is received within the outlet port 10, the couplings 32, 33, 34 are intended to be retained therein by the U-shaped clips 17. For example, each of the couplings 32, 33, 34 may include a plurality of first radial grooves 20, and a plurality of second radial grooves 22. Each second radial groove 22 may be configured to be received by a sealing member, such as an o-ring. Each first radial groove 20 of couplings 32, 33 may be configured to be received by two arm portions 18 of each of the U-shaped clips 17. In addition, the size of the first radial groove 20 of coupling 34 may be configured to be received by at least one arm portion 18 of each of the U-shaped clips 17. According to an exemplary embodiment, the size of the first radial grooves 20 and the second radial grooves 22 may be equal. According to other exemplary embodiments, the size of the first radial grooves may be smaller or larger than the second radial grooves. As shown in FIG. 7, each of a first radial groove 20 for the couplings 32, 33 may be received by a U-shaped clip 17 from two opposite sides of the mixing valve 1. According to another embodiment, each of the first radial grooves 20 of the couplings 32, 33 may be received by a U-shaped clip from the same side of the mixing valve 1.

According to an exemplary embodiment, a single U-shaped clip may be configured to simultaneously couple to each of the couplings 32, 33, and 34 when the supply lines 5, 7 are received within the inlet ports 9, 12 and the fluid conduit 11 is received within the outlet port 10. As shown in FIGS. 7-8, each arm portion 18 of the U-shaped clip 17 may be configured to be received within the radial groove 20 of the couplings 32, 33. Concurrently, one arm portion 18 of the U-shaped clip may be received within the radial groove 20 of the coupling 34. Therefore, a single U-shaped clip 17 may be simultaneously received within a portion of each of the couplings 32, 33, and 34 when the supply lines 5, 7, and the fluid conduit 11 are received within the mixing valve 1. As a result, a single U-shaped clip may be used to retain a plurality of supply lines 5, 7 and the fluid conduit 11 within the mixing valve 1. Further, the neck portion 19 of each U-shaped clip 17 may be received within the radial groove of the coupling (either coupling 32 or coupling 33) that is first received within the opening 35 (not shown in FIGS. 7-8, but shown, for example, in FIG. 9) of the U-shaped clip.

According to an exemplary embodiment, one arm portion 18 of one U-shaped clip may be sufficient to retain the fluid conduit 11 within the outlet port 10. In contrast to the supply lines 5, 7, the fluid conduit 11 is not pressurized, and less surface area between an arm portion 18 and the groove 20 may be required to retain the fluid conduit 11 within the outlet port 10. Further, an outer side of one arm portion 18 may be configured to interact with the groove 20 of the coupling 34, whereas an inner side of each arm portion 18 used in the mixing valve assembly 8 may be configured to interface with the supply lines 5, 7.

According to an exemplary embodiment, the first radial grooves 20 of the couplings 32, 33, 34 may be configured to be in line (i.e., coplanar or linearly aligned) with the lateral slots 14, 16 when the inlet ports 9, 12 of the mixing valve 1 are received by the supply lines 5, 7 and when the outlet port 10 is received by the fluid conduit 11. Therefore, when each of a radial groove 20 of the fluid conduit 11 and the supply lines 5, 7 are lined up with either of the lateral slots 14, 16 of the mixing valve 1, the first radial groove 20 and lateral slot 14, 16 may be received by the U-shaped clip 17, thereby retaining the supply lines 5, 7 and the fluid conduit 11 within the mixing valve 1.

According to an exemplary embodiment, the second radial grooves 22 of the couplings 32, 33, 34 may be received by a sealing member, such as a rubber o-ring (which is not shown in the Figures). The sealing member may be used to provide a leak-proof interface between either of the mixing valve 1 and either of the inlet ports 9, 12 or the outlet port 10. It is important to note, according to an exemplary embodiment, the second radial grooves 22 (with sealing members received therein) are positioned proximate the sealing surface 23 when the couplings 32, 33, and 34 are received within the mixing valve 1, in order to provide a suitable water seal between the couplings 32, 33, 34 and the mixing valve 1.

According to various exemplary embodiments, the couplings 32, 33, 34 may be made from a variety of materials. Further, the couplings 32, 33, and the coupling 34, may be coupled to the supply lines 5, 7 and the fluid conduit 11, respectively, in a variety of ways. According to an exemplary embodiment, the supply lines 5, 7 and the fluid conduit 11 are made from a polymeric material that is braided. According to various exemplary embodiments, a coupling may be made from a variety of materials, such as a brass, a polymeric material, a composite material, or any other suitable material. According to an exemplary embodiment, the couplings 32, 33 and the coupling 34 are crimped onto the ends of the supply lines 5, 7 and the fluid conduit 11, respectively. According to another embodiment, each of the couplings may be overmolded onto the end of one of the supply lines or the fluid conduit. Other methods, such as spin welding, may be used to couple the couplings to the end of one of the supply lines or the fluid conduit. According to another exemplary embodiment, a stainless steel braided hose may be used as either the supply lines or the fluid conduit for a faucet assembly, and the hose may be threadably coupled to a coupling. A copper line may be used as either of the supply lines or as the fluid conduit for a faucet assembly, and the couplings may be soldered or brazed to the supply lines or the fluid conduit. While the present disclosure has described several types of materials that may be used as supply lines, a fluid conduit, and couplings, it should be understood that other types of materials may be used to make a supply line, a fluid conduit, and a coupling, according to other exemplary embodiments. It should further be understood that other methods may be used to couple a coupling to either of a supply line or a fluid conduit, according to other exemplary embodiments.

Referring now to FIG. 9, a U-shaped clip, such as the U-shaped clip 17, may include two arm portions 18 and a neck portion 19. An opening 35 may be defined between each arm portion 18 of the U-shaped clip 17. The neck portion 19 may be formed between the two arm portions 18. According to various exemplary embodiments, the U-shaped clip 17 may be made from a polymeric material, a metal, a composite material, or any other suitable material. Further, the U-shaped clip may be configured to withstand the forces of a water supply line under pressure.

As shown in FIGS. 7 and 8, and according to an exemplary embodiment, a U-shaped clip may have a substantially rectangular cross-section. As shown in FIG. 9, and according to another exemplary embodiment, a U-shaped clip may have a generally oval cross-section. While FIGS. 7-9 show various types of U-shaped clips, it should be understood that a U-shaped clip used with the mixing valve assemblies discussed herein may have another cross-section according to other exemplary embodiments (i.e., a U-shaped clip having a circular cross-section, H-shaped, I-shaped cross-section, etc.).

According to an exemplary embodiment of this disclosure, a plurality of pins may be used to retain a plurality of supply lines and a fluid conduit within a mixing valve. For example, a lateral hole may be disposed within a side wall of the mixing valve. Further, the lateral hole may be configured to receive a straight pin. Also, each of the ends of the supply lines and the fluid conduit may be coupled to a coupling that includes a radial groove. When the fluid supply lines and the fluid conduit are received within the inlet ports and the outlet port, respectively, of the mixing valve, a portion of each of the radial grooves of the supply lines and the fluid conduit may be configured to be linearly aligned with the lateral hole, so that the lateral hole and the radial grooves may be received by a straight pin in order to retain the supply lines and the fluid conduit within the mixing valve.

Referring now to FIG. 10, an outer clip, such as the outer clip 31, may be used with the mixing valve assembly 8. As shown in FIG. 10, the outer clip 31 may be generally shaped like a number "3." For example, the outer clip 31 may include two symmetrical curved portions. As shown in FIG. 2, each curved portion of the outer clip 31 may be configured to couple to the side wall 15 of the mixing valve 1, proximate either of the two inlet ports 9, 12. Further, the shape of the outer clip 31 may be configured to match the contour of the side wall 15 in order to retain at least one U-shaped clip 17 within either of the lateral slots 14, 16.

According to an exemplary embodiment, the outer clip 31 may be made out of an elastically deformable (i.e., flexible, bendable, resilient) material, such as a polymeric material, a metal, or another flexible material. In other words, the outer clip 31 may be configured to be flexibly coupled onto the side wall 15 of the mixing valve 1. According to other embodiments, the outer clip 31 may not be made out of a flexible material (i.e., a stiff material). While FIGS. 2 and 10 show a particular outer clip, this disclosure is not intended to limit the possible ways in which an outer clip may be configured, and it should be understood that other outer clips may be used in a mixing valve assembly discussed herein according to other exemplary embodiments.

According to another exemplary embodiment, a mixing valve assembly may not include an outer clip used to retain a U-shaped clip within a mixing valve. For example, a U-shaped clip may be used in a mixing valve assembly to retain a plurality of supply lines and a fluid conduit within a mixing valve, and the mixing valve may be received by a spout hub or another element which effectively retains the U-shaped clip within the mixing valve. According to another exemplary embodiment, other types of members, such as an elastic member, may be configured to be coupled around a side of a mixing valve in order to retain a U-shaped clip within the mixing valve.

Figure 11:
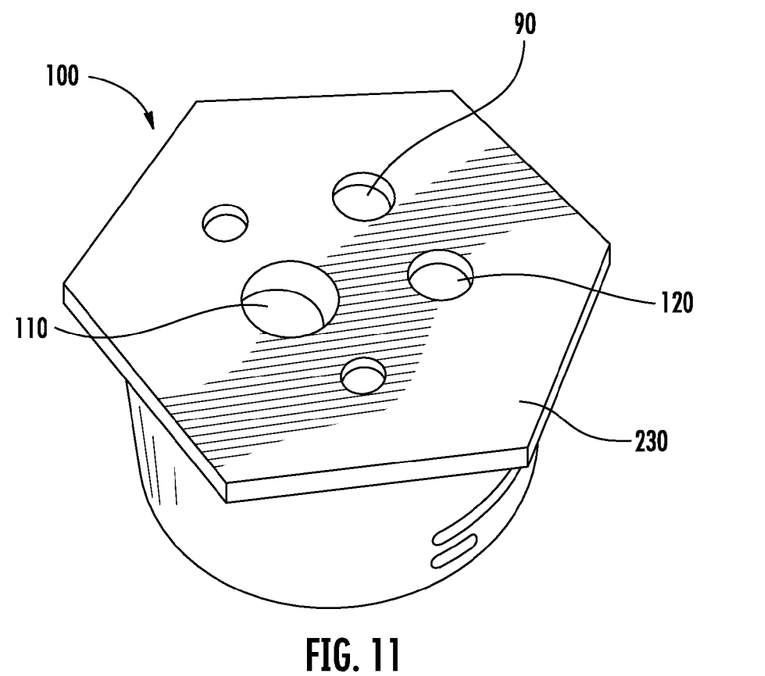
FIG. 11 is a perspective view of a mixing valve for a mixing valve assembly, according to another exemplary embodiment.
Figure 12:
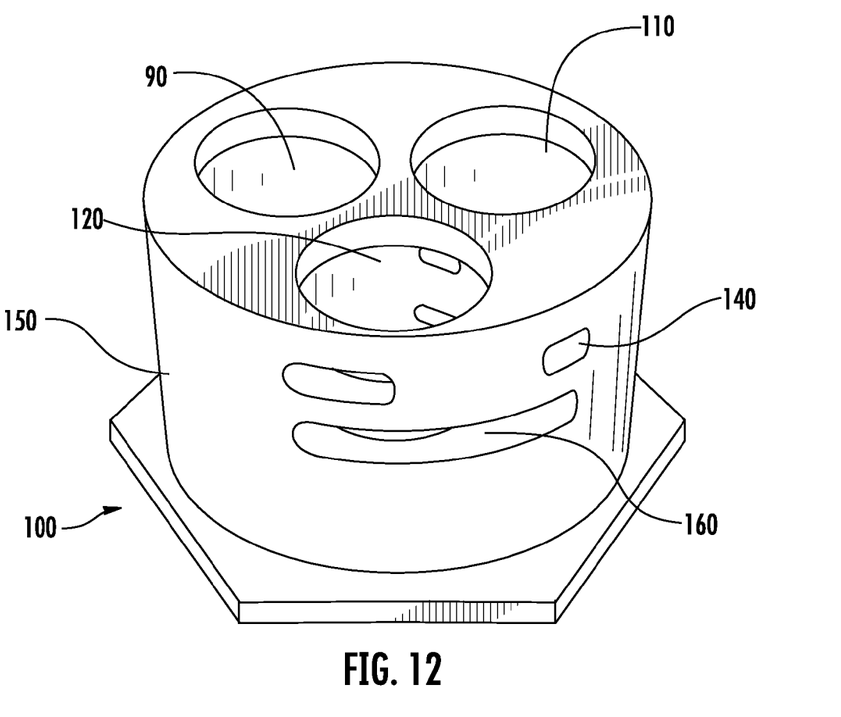
FIG. 12 is another perspective view of the mixing valve shown in FIG. 11.

Referring to FIGS. 11-12, according to another embodiment, the mixing valve 1 may include a body portion that is essentially cylindrical and includes an outer surface 150. The mixing valve 100 may include a head portion that is defined on one side by a upper surface 230. The perimeter of the head portion and the upper surface 230 may be polygonal in shape (i.e. rectangular, pentagonal, hexagonal, etc.). The head portion may be configured to position the mixing valve within a faucet assembly in a particular orientation. Further, the upper surface 230 may include a plurality of positioning holes, which may be used to position the mixing valve 100 relative to a valve assembly, or a spout hub. As shown in FIGS. 11-12, the mixing valve 100 includes two inlet ports 90, 120, as well as one outlet port 110. The mixing valve 100 also includes two lateral slots 140, 160 that extend through the mixing valve 100 in opposite directions.

According to an exemplary embodiment, the mixing valve 1 may be easily disassembled by performing the following steps. First, the supply valves for the supply lines 5, 7 should be turned off, thereby cutting off the water supply from the supply lines. Depending on how the valve assembly is configured, the valve assembly may need to be detached from the mixing valve assembly 8. Next, the mixing valve assembly may be lifted from a spout hub or a spout body. The outer clip 31 may be detached from the side wall 15 of the mixing valve 1, if the outer clip is provided with the mixing valve assembly 8. Next, any U-shaped clips 17 may be pulled from the lateral slots 14, 16. Last, the supply lines 5, 7 and the fluid conduit 11 may be removed from the inlet ports 9, 12 and the outlet port 10, respectively.

Advantageously, a plurality of fluid supply lines and a fluid conduit may be retained by a single U-shaped clip within a mixing valve assembly. One skilled in the art will readily appreciate that, for a mixing valve assembly provided in the various embodiments of this disclosure, there may be some limited freedom of movement, including rotational movement, of a supply line or a conduit that is retained within a mixing valve. As a result, it may be easier for a person to assemble a mixing valve assembly within a faucet assembly. A faucet assembly having a fluid supply line and fluid conduit with greater flexibility and freedom of movement may also be easier to install on a mounting surface, such as a sink or a countertop. In addition, a person skilled in the art will appreciate that inexpensive materials, such as polymeric materials, may be used to manufacture a mixing valve assembly provided in the various embodiments of this disclosure.

As utilized herein, the terms "approximately," "about," "substantially," "essentially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the mixing valve assembly as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, manufacturing processes, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A mixing valve for a faucet, the mixing valve, comprising:
   a body having a first end, a second end opposite the first end, and a side wall extending between the first end and the second end;
   a plurality of bores having ports in the first end and extending at least partially through the body between the first end and the second end, the plurality of bores comprising an inlet bore configured to receive therein an end portion of a fluid supply line and an outlet bore configured to receive therein an end portion of a fluid outlet line;
   a lateral slot having an aperture in the side wall, a first branch of the lateral slot extending from the aperture along a perimeter of the side wall and intersecting the inlet bore, and a second branch of the lateral slot extending from the aperture at least partially through the body and intersecting both the inlet bore and the outlet bore; and
   a coupler having a neck, a first arm extending from a first end of the neck, and a second arm extending from a second end of the neck;
   wherein the coupler is configured for insertion through the lateral slot such that the first arm extends through the first branch along the perimeter of the side wall and intersects the inlet bore, and the second arm extends through the second branch at least partially through the body and intersects both the inlet bore and the outlet bore;
   wherein the first arm and the second arm engage opposite sides of the end portion of the fluid supply line so as to retain the fluid supply line within the body between the first arm and the second arm;
   wherein the second arm passes between the end portions of the fluid supply line and the fluid outlet line such that an inner surface of the second arm engages the end portion of the fluid supply line and an outer surface of the second arm engages the end portion of the fluid outlet line so as to retain the fluid outlet line within the body.

2. The mixing valve of claim 1, wherein the body and the coupler are formed from a polymeric material.

3. The mixing valve of claim 1, wherein the body is formed from a metal.

4. The mixing valve of claim 1, wherein the coupler has a generally U-shaped configuration and the first and second arms of the U-shaped coupler are substantially parallel to one another and configured for receipt within the first and second branches of the lateral slot formed in the body, wherein the first and second branches are substantially parallel to one another.

5. The mixing valve of claim 1, further comprising a clip that is coupled to an exterior surface of the mixing valve to retain the coupler within the body.

6. The mixing valve of claim 1, wherein the end portions of the fluid supply line and the fluid outlet line include grooves formed in exterior surfaces thereof, and the end portions are configured for engaging with the coupler when the coupler is inserted through the lateral slot in the sidewall of the body.

7. The mixing valve of claim 1, further comprising:
a supply line coupling member having a first groove along a circumferential surface thereof, wherein the supply line coupling member is coupled to the end portion of the fluid supply line and inserted into the inlet bore; and
an outlet line coupling member having a second groove along a circumferential surface thereof, wherein the outlet line coupling member is coupled to the end portion of the fluid outlet line and inserted into the outlet bore.

8. The mixing valve of claim 1, wherein the plurality of bores further comprise a second inlet bore configured to receive therein an end portion of a second fluid supply line.

9. The mixing valve of claim 8, further comprising:
a second lateral slot having a second aperture in the side wall; and
a second coupler configured for insertion through the second lateral slot;
wherein each of the two couplers are configured for insertion through the sidewall of the body at different locations, wherein the two couplers each engage the end portions of the first and second fluid supply lines inserted into the inlet bores and the end portion of the fluid outlet line inserted into the outlet bore to retain the end portions of the first and second fluid supply lines and the fluid outlet line within the body.

10. The mixing valve of claim 7, wherein each of the coupling members further includes a sealing groove, and the sealing grooves receive a sealing member.

11. A mixing valve for a faucet, the mixing valve, comprising:
a body having a first end, a second end opposite the first end, and a side wall extending between the first end and the second end;
a plurality of bores having ports in the first end and extending at least partially through the body between the first end and the second end, the plurality of bores comprising a first inlet bore configured to receive therein an end portion of a first fluid supply line, a second inlet bore configured to receive therein an end portion of a second fluid supply line, and an outlet bore configured to receive therein an end portion of a fluid outline line;
a lateral slot having an aperture in the side wall, a first branch of the lateral slot extending from the aperture along a perimeter of the side wall and intersecting both of the inlet bores, and a second of the lateral slot branch extending from the aperture least partially through the body and intersecting both of the inlet bores and the outlet bore; and
a coupler having a neck, a first arm extending from a first end of the neck, and a second arm extending from a second end of the neck;
wherein the coupler is configured for insertion through the lateral slot such that the first arm extends through the first branch along the perimeter of the side wall and intersects both of the inlet bores, and the second arm extends through the second branch at least partially through the body and intersects both of the inlet bores and the outlet bore;
wherein the first arm and the second arm engage opposite sides of the end portions of both fluid supply lines so as to retain both fluid supply lines within the body between the first arm and the second arm;
wherein the second arm passes between the end portions of the fluid supply lines and the fluid outlet line such that an inner surface of the second arm engages the end portions of the fluid supply lines and an outer surface of the second arm engages the end portion of the fluid outlet line so as to retain the fluid outlet line within the body.

12. The mixing valve of claim 11, wherein the body and coupler each are formed from a polymeric material.

13. The mixing valve of claim 11, wherein the body is formed from a metal.

14. The mixing valve of claim 11, wherein the coupler comprises a plurality of couplers that retain the plurality of fluid supply lines and the fluid outlet line within the body.

15. The mixing valve of claim 11, wherein the coupler has a generally U-shaped configuration and the first and second arms of the U-shaped coupler are substantially parallel to one another and configured for receipt within the first and second branches of the lateral slot formed in the body, wherein the first and second branches are substantially parallel to one another.

16. The mixing valve of claim 15, wherein the end portion includes a surface that abuts against the neck of the U-shaped coupler when the coupler is inserted through the sidewall of the body.

17. The mixing valve of claim 16, further comprising a supply line coupling member coupled to the end portion of the fluid supply line, the supply line coupling member comprising a circumferential groove configured to abut against the neck of the U-shaped coupler, wherein the circumferential groove is integrally formed on the supply line coupling member.

18. The mixing valve of claim 17, wherein the supply line coupling member includes a radial groove configured to receive a sealing member.

19. A mixing valve for a faucet, the mixing valve, comprising:
a body configured to receive therein end portions of a fluid supply line and a fluid outlet line;
a plurality of bores extending at least partially through the body, the plurality of bores comprising an inlet bore and an outlet bore;
a first lateral slot disposed along a side wall of the body and extending at least partially through the body such that the first lateral slot intersects both the inlet bore and the outlet bore; and
a first coupler inserted through the first lateral slot, the first coupler comprising a first arm that extends through a first branch of the first lateral slot along a perimeter of the side wall and intersecting the inlet bore, and a second arm that extends through a second branch of the first lateral slot at least partially through the body and intersecting both the inlet bore and the outlet bore;
wherein the second arm passes between the end portions of the fluid supply line and the fluid outlet line such that an inner surface of the second arm engages the end portion of the fluid supply line and an outer surface of the second arm engages the end portion of the fluid outlet line so as to retain both the fluid supply line and the fluid outlet line within the body.

20. The mixing valve of claim 19, further comprising:
a second lateral slot disposed along the side wall of the body, offset from the first lateral slot, and extending at least partially through the body in a direction opposite the first lateral slot; and
a second coupler inserted through the second lateral slot, the second coupler comprising a third arm that extends through a third branch of the second lateral slot along a perimeter of the side wall and intersects the inlet bore, and a fourth arm that extends through a fourth branch of the second lateral slot at least partially through the body and intersects both the inlet bore and the outlet bore.

\* \* \* \* \*